US 9,122,532 B2

(12) United States Patent
Kosuru et al.

(10) Patent No.: US 9,122,532 B2
(45) Date of Patent: Sep. 1, 2015

(54) METHOD AND APPARATUS FOR EXECUTING CODE IN A DISTRIBUTED STORAGE PLATFORM

(75) Inventors: Yekesa Kosuru, Westford, MA (US); Amit Jaiswal, Bangalore (IN); Abhijit Bagri, San Francisco, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 114 days.

(21) Appl. No.: 13/458,677

(22) Filed: Apr. 27, 2012

(65) Prior Publication Data
US 2013/0036149 A1 Feb. 7, 2013

(30) Foreign Application Priority Data
Apr. 29, 2011 (IN) .......................... 1479/CHE/2011

(51) Int. Cl.
*G06F 15/16* (2006.01)
*G06F 9/50* (2006.01)
(52) U.S. Cl.
CPC ............ *G06F 9/5027* (2013.01); *G06F 9/5066* (2013.01)
(58) Field of Classification Search
USPC .................................. 709/201, 225; 714/25, 2
See application file for complete search history.

(56) References Cited

U.S. PATENT DOCUMENTS

| | | | | |
|---|---|---|---|---|
| 6,614,546 B1 * | 9/2003 | Kurozasa | ..................... | 358/1.15 |
| 7,395,536 B2 * | 7/2008 | Verbeke et al. | ............... | 718/100 |
| 7,496,761 B2 * | 2/2009 | Sonkin et al. | ................. | 713/182 |
| 7,533,141 B2 * | 5/2009 | Nadgir et al. | ................. | 709/200 |
| 7,979,743 B2 * | 7/2011 | Garbow | .......................... | 714/25 |
| 8,614,546 B2 * | 12/2013 | Utsunomiya et al. | ......... | 313/506 |
| 2004/0019514 A1 * | 1/2004 | Verbeke et al. | ................... | 705/9 |
| 2004/0019890 A1 * | 1/2004 | Verbeke et al. | ............... | 718/100 |
| 2004/0098447 A1 * | 5/2004 | Verbeke et al. | ............... | 709/201 |
| 2004/0148326 A1 * | 7/2004 | Nadgir et al. | ................. | 709/200 |
| 2006/0075253 A1 * | 4/2006 | Sonkin et al. | ................. | 713/183 |
| 2007/0121147 A1 * | 5/2007 | Corona et al. | ............... | 358/1.15 |
| 2010/0023799 A1 * | 1/2010 | Garbow | .......................... | 714/2 |
| 2010/0238488 A1 * | 9/2010 | Alaghband et al. | .......... | 358/1.15 |
| 2012/0101870 A1 * | 4/2012 | Gates et al. | ................... | 705/7.28 |
| 2012/0154866 A1 * | 6/2012 | Chatow et al. | ............... | 358/1.15 |
| 2012/0154886 A1 * | 6/2012 | Heikenfeld et al. | .......... | 359/228 |
| 2013/0163014 A1 * | 6/2013 | Xiao | ............................ | 358/1.13 |

* cited by examiner

*Primary Examiner* — Tammy Nguyen
(74) *Attorney, Agent, or Firm* — Ditthavong & Steiner, P.C.

(57) ABSTRACT

An approach is provided for creating a framework for executing code in nodes of a distributed storage platform. An in-node code framework receives at least one job for execution over a distributed computing platform. The in-node code framework determines at least one distributed storage platform containing at least a portion of the data for executing the at least one job. The in-node then processes and/or facilitates a processing of the at least one job to determine code for executing at one or more storage nodes of the at least one distributed storage platform, wherein the code supports the at least one job.

20 Claims, 8 Drawing Sheets

METHOD AND APPARATUS FOR EXECUTING CODE IN A DISTRIBUTED STORAGE PLATFORM

RELATED APPLICATIONS

This application claims the benefit of the earlier filing date under 35 U.S.C. §119(a) of Indian Patent Application No. 1479/CHE/2011 filed Apr. 29, 2011, entitled "Method and Apparatus for Executing Code in a Distributed Storage Platform," the entirety of which is incorporated herein by reference.

BACKGROUND

Service providers and device manufacturers (e.g., wireless, cellular, etc.) are continually challenged to deliver value and convenience to consumers by, for example, providing compelling network services. Important differentiators in the industry are application and network services as well as capabilities to support and scale these services. In particular, these applications and services can include accessing and managing data utilized, for example, by social services, media services, employment services, etc. These services may be implemented via one or more servers (or nodes) and/or clusters of servers (or nodes) that provide, for instance, distributed computing and/or data storage to support the services. Traditionally, the functions of computing nodes and storage nodes have been segregated. As a result, service providers and device manufacturers face significant technical challenges to managing and/or integrating the functions (e.g., computing functions, storage functions, etc.) of these servers or nodes.

SOME EXAMPLE EMBODIMENTS

Therefore, there is a need for executing code in a distributed storage platform to, for instance, more efficiently use the resources (e.g., processing capabilities) of storage nodes that might otherwise remain idle.

According to one embodiment, a method comprises determining at least one job for execution over a distributed computing platform. The method also comprises determining at least one distributed storage platform containing at least a portion of the data for executing the at least one job. The method further comprises processing and/or facilitating a processing of the at least one job to determine code for executing at one or more storage nodes of the at least one distributed storage platform, wherein the code supports the at least one job.

According to another embodiment, an apparatus comprises at least one processor, and at least one memory including computer program code for one or more computer programs, the at least one memory and the computer program code configured to, with the at least one processor, cause, at least in part, the apparatus to determine at least one job for execution over a distributed computing platform. The apparatus is also caused to determine at least one distributed storage platform containing at least a portion of the data for executing the at least one job. The apparatus further is further caused to process and/or facilitate a processing of the at least one job to determine code for executing at one or more storage nodes of the at least one distributed storage platform, wherein the code supports the at least one job.

According to another embodiment, a computer-readable storage medium carries one or more sequences of one or more instructions which, when executed by one or more processors, cause, at least in part, an apparatus to determine at least one job for execution over a distributed computing platform. The apparatus is also caused to determine at least one distributed storage platform containing at least a portion of the data for executing the at least one job. The apparatus further is further caused to process and/or facilitate a processing of the at least one job to determine code for executing at one or more storage nodes of the at least one distributed storage platform, wherein the code supports the at least one job.

According to another embodiment, an apparatus comprises means for determining at least one job for execution over a distributed computing platform. The apparatus also comprises means for determining at least one distributed storage platform containing at least a portion of the data for executing the at least one job. The apparatus further comprises means for processing and/or facilitating a processing of the at least one job to determine code for executing at one or more storage nodes of the at least one distributed storage platform, wherein the code supports the at least one job.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a framework for executing code in a distributed storage platform are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
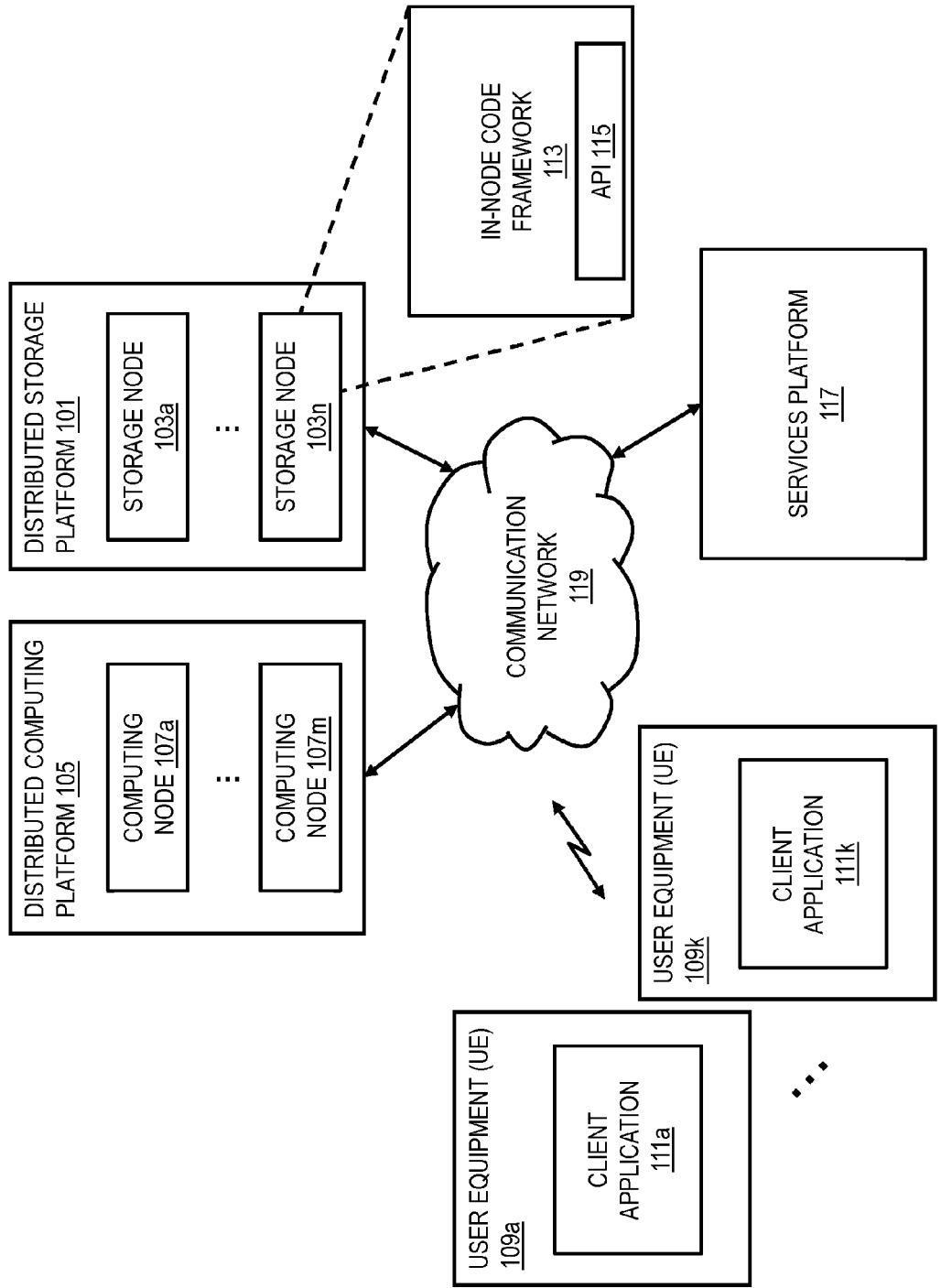
FIG. 1 is a diagram of a system capable of providing a framework for executing code in a distributed storage platform, according to one embodiment.

FIG. 1 is a diagram of a system capable of providing services via a backend capable of rebalancing data, according to one embodiment. With an increasing demand for network services (e.g., social networking services, media services, etc.), the need to properly manage access of data to users of the services is of growing concern. An integral part of such services is providing data to users while allowing for scalability and redundancy as the volume of data handled by the services increases. As a result, service providers have developed storage platforms (e.g., distributed storage platforms) capable of handling vast collections of large databases that store, for instance, information, data, etc. generated by any number of services (e.g., both integrated and individual services). Many of these databases can reach multiple terabytes, petabytes, or more in size. In some cases, storage platforms can additionally be split larger databases into smaller databases (e.g., partitions or database shards) maintained at multiple nodes to allow for the scalability and/or redundancy noted above. One example of a distributed storage platform is a distributed key value store (e.g., a Voldemort-based key-value storage system as described at http://project-voldemort.com/design.php, last accessed Apr. 27, 2011, which is incorporated herein in its entirety) which given a key returns as corresponding value.

At the same time, service providers have developed corresponding computing platforms capable of efficiently processing the potentially vast quantities of data stored within such distributed storage platforms. In some embodiments, these computing platforms can provide for parallel or distributed computing across multiple computing nodes. By way of example, the distributed computing platform may operate using a parallel processing framework (e.g., an Apache Hadoop framework as described at http://hadoop.apache.org/#What+Is+Hadoop%3F, last accessed Apr. 27, 2011, which is incorporated herein in its entirety) that supports execution of distributed applications for processing large databases via potentially thousands of computing nodes. Such a framework can be based on, for instance, a Map Reduce paradigm (e.g., as described at http://hadoop.apache.org/mapreduce, last accessed Apr. 27, 2011, which is incorporated herein in its entirety) for parallel processing whereby a master node partitions a job or task among multiple subordinate computing nodes and the aggregates the results from the subordinate computing nodes to arrive at a "reduced" result. For example, the subordinate computing nodes can then perform a "map" function on their respective portions of the jobs to process an input and generate a result or output.

Within a context a combined system whereby a distributed computing or processing platform interacts with a distributed storage platform to process large amounts of data, it is often the case that large amounts of data are transferred from the storage platform for processing at the distributed computing platform. Because the processing is performed at the computing platform, the storage platform is often requested to transfer more data than is needed to process a corresponding job at the computing platform, thereby resulting in potentially unnecessary network bandwidth usage. As the volumes of data increase, the amount of wasted bandwidth can also increase. For example, when the job is building a social graph for a person, the computing platform or other requesting client may only need the user identifier of the person and a list of identifiers of the person's friends, but the storage platform may provide complete profile data of the person and the person's friends. Other example use cases are providing generic rules for data transformation. For example, the computing platform or client may need only a person's age for processing, but the storage platform stores only the person's birth date. In this case, the storage platform may transfer the birth date expressed as month, date, and year which requires for data to transmit than an age represented in numerical form. Accordingly, service providers face significant challenges to reducing the resource burden associated with data-intensive applications implemented in distributed computing platforms and distributed storage platforms.

To address these problems, a system 100 of FIG. 1 introduces the capability to support executing arbitrary code in a distributed storage platform 101 or in storage nodes 103a-103n (also collectively referred to as storage nodes 103) of the distributed storage platform 101. In this way, the storage nodes 103 can process data or information requested by a distributed computing platform 105, computing nodes 107a-107m (also collectively referred to as computing nodes 107), user equipment (UEs) 109a-109k (also collectively referred to as UEs 109), client applications 111a-111k (also collectively referred to as client applications 111) of the UEs 109, or a combination thereof.

In various embodiments, the distributed storage platform 101 is key value store including one or clusters of the storage nodes 103. In certain embodiments, a distributed key value store allows for the storage of values by key. The value itself can be a corpus or body of information that need not be structured. An index of keys can be generated to search for keys that may be useful to users. The key can then be retrieved and sent to a client system. Although various embodiments are described with respect to the key value store, it is contemplated that the approach described herein may be used with other databases (e.g., a distributed database under the control of a database management system, where the storage devices are not all attached to a common processor or a non-distributed database). Key based storage can additionally be useful for social services (e.g., where the key is tied to a user profile), user sessions, shopping carts (e.g., where the key is for a shopping selection for an account of the user), or the like. In some embodiments, the database can include one or more shards and/or horizontal partitioning systems. In certain embodiments, horizontal partitioning is a database where rows of a database table are separated instead of separating by columns. Each partition/separation can constitute a shard. The shards can further be partitioned by one or more rows.

In one embodiment, the storage nodes 103 may include an in-node code framework 113 for executing the code at the storage nodes 103. Although FIG. 1 depicts the in-node code framework 113 as a component of the storage nodes 103, it is contemplated that, in addition or alternatively, the in-node code framework 113 or one or more functions of the in-node code framework 113 can be resident in the distributed storage platform 101, the distributed computing platform 105, the computing nodes 107, or other component of the system 100. In one embodiment, the in-node code framework 113 includes one or more application programming interfaces (APIs) 115 to represent code in a map reduce form which can be parallelized among the storage nodes 103.

In one embodiment, the in-node code framework 113 receives a job specifying or otherwise indicating code for execution at the distributed storage platform 101 and/or the storage nodes 103. By way of example, the job may be received from the distributed computing platform 105, the client application 111, and/or one or more services of the services platform 117. The services platform 117 may, for instance, support any service (e.g., social networking service, music service, video service, mapping service, navigation service, etc.) available over a communication network 119. Moreover, a user may provide logic or code in the form of, for instance, a script along with the key to be fetched from the distributed storage platform 101. The in-node code framework 113 of the respective storage nodes 103 then fetches the key requested for the job and executes the code (e.g., the script) on the value and returns the result.

By way of example, when operated in conjunction with the a map-reduce embodiment of the distributed computing platform 105, the map phase of the map reduce job is executed at the distributed storage platform 101 and/or the storage nodes 103, thus leveraging the otherwise potentially idle processing power of the storage nodes 103. This, in turn, saves network bandwidth and reduces the complexity of the performing the job at the client side (e.g., the originator of the job such as the distributed computing platform 105 and/or the client applications 111).

In some embodiments, the in-node code framework 113 can throttle or otherwise adjust resources (e.g., processing resources) devoted to executing the code by the one or more storage nodes 103 to avoid degradation of service capabilities for the storage nodes 103's primary functions (e.g., live data serving). In other embodiments, the in-node code framework 113 provides a lightweight execution environment (e.g., a JavaScript based environment) so that code (e.g., map-reduce code) can be run in the distributed storage platform 101 and/or the storage nodes 103, in lieu of transferring data and the processing of the data to the distributed computing platform 101.

In one sample use case, the distributed computing platform 105 provides for analytics processing of the data stored in the distributed storage platform 101 to support data-intensive applications (e.g., providing recommendations, determining user behavior, etc.) via parallel processing (e.g., via a map-reduce paradigm). However, such analytics are generally performed as offline batch processing by the distributed computing platform 105. Accordingly, the lightweight and/or real-time processing capabilities of the in-node code framework 113 can provide seamless integration with the distributed computing platform 105, to provide both offline and real-time processing capabilities.

By way of example, the communication network 119 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 109 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 109 can support any type of interface to the user (such as "wearable" circuitry, etc.).

By way of example, the distributed storage platform 101, the distributed computing platform 105, the UE 109, and the services platform 117 communicate with each other and other components of the communication network 119 using well known, new or still developing protocols. In this context, a protocol includes a set of rules defining how the network nodes within the communication network 119 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Further, communications between the storage nodes 103 and/or the computing nodes 107 can be performed via one or more of the aforementioned protocols and/or technologies. Further, fast connections (e.g., gigabit Ethernet, fiber channel, etc.) can be utilized and the storage nodes 103, the computing nodes 107, and/or the other components of the system 100.

In one embodiment, the distributed storage platform 101, the distributed computing platform, the UE 109, and/or the services platform 117 may interact according to a client-server model. Further the services platform(s) 117 can provide services to the client applications 111 via the client-server model. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
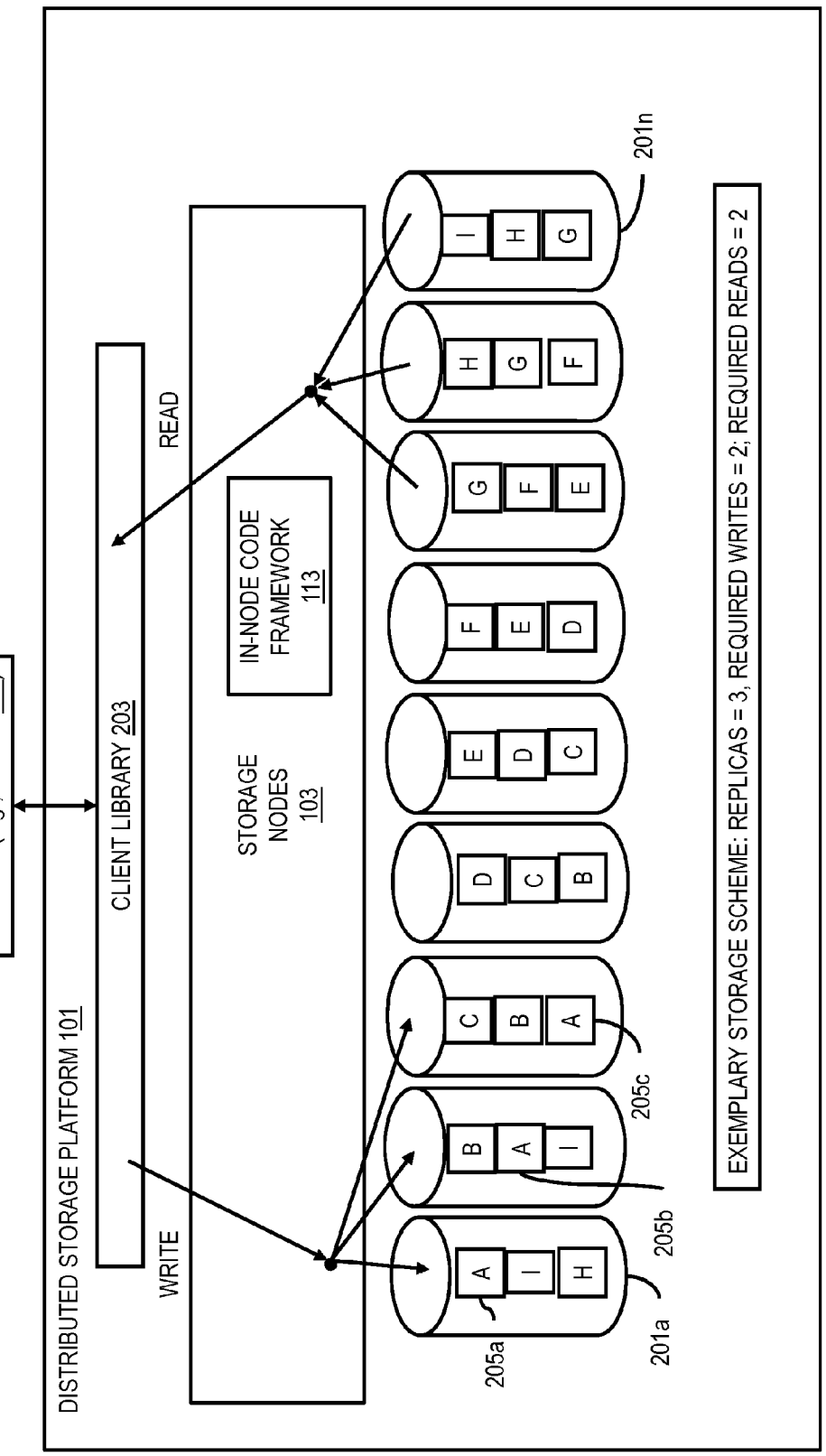
FIG. 2 is a diagram of the components of a distributed storage platform, according to one embodiment.

FIG. 2 is a diagram of the components of a distributed storage platform 101, according to one embodiment. In one embodiment, the distributed storage platform 101 is a key value store that includes one or more components for providing storage of data that can be indexed, stored, retrieved, and searched using an in-node code framework 113. As shown in the example of FIG. 2, the distributed storage platform 101 can distribute one or more databases 201a-201n (e.g., key value stores) over one or more storage nodes 103 (e.g., storage servers resident at one or more locations). As noted previously, the storage nodes 103 via the in-node code framework 113 can execute code (e.g., scripts) to operate over the databases 207 associated with the respective storage nodes 103 to generate results in response client requests.

In one embodiment, the clients and/or their respective code or scripts can be stored in, for instance, the client library 203. By way of example, the distributed computing platform 105, the computing nodes 107, the UEs 109, the client application 111, and/or the services platform 117 may be considered as clients that receive database services from the distributed storage platform 101. In some embodiments, the client library 203 may include an interface that can determine which storage nodes 103 to communicate with to execute code for generating results from databases 201. In certain embodiments, databases 201 are stored utilizing a key and value mechanism that allows storage using the key. A portion (e.g., a partition, a shard, etc.) of each database (e.g., portions A-I) can be linked to a key. In one embodiment, the key is hashed to determine which portion the key is linked to. A key may be hashed using a ring method, for example. Using the ring, each key and portion may be hashed to a primary location (e.g., based on a key with an identifier that is hashed into a number k) as well as one or more backup or replicate locations. The backup or replicate locations may be locations associated with the next storage node 103 associated with the hash. The client library 203 determines which storage nodes 105 to read and write information from and to using the key hashes for executing client- or user-defined code via the in-node code framework 113. The client library 203 and/or the storage nodes 103 may include one or more lookup tables which portions of the database belong to which storage node 103. In this way, the client library 203 can identify which storage nodes 103 include data for executing code to perform requested jobs or tasks.

In certain embodiments, the portions (e.g., portion A 205a-205c) may be stored using multiple storage nodes 103 over multiple databases 201. In one embodiment, portions may be replicated over n number (e.g., replicas=3) of storage nodes 205 and/or databases 201 for redundancy, failover, and to reduce latency. Moreover, the portions may be written to and read from at the same time by the client library 203. When reading from the databases 201, the client library 203 may determine if there are any consistency issues (e.g., portion 205a does not match portion 205b). Moreover, in certain embodiments, an example storage scheme may require that when performing a write or a read, at least a certain number (e.g., required writes=2, required reads=2 etc.) of portions need to be successfully written or read. This allows for redundancy and quorum consistency. If a database 201a fails or is otherwise incapacitated, a portion 205a associated with the database 201a may be later updated with content it should include by the storage nodes 103 having replicated portions 205b, 205c.

In one embodiment, the in-node code framework 113 can relax the quorum requirement when executing code at storage nodes 103 that have one or more replicate nodes. For example, under quorum relaxation, one storage node 103 or a replicate set of nodes can execute the specified code to generate the result without having to execute the same code at the other replicates. In this way, the distributed storage platform 101 can further reduce the resource burden that would otherwise attach with requesting all or a quorum of replicate nodes to execute the same code to generate requested results.

The key value store is an example of a particular database structure that can be utilized in the various embodiments described herein. However, it is contemplated that other types of database structures, for example, other key value stores, other databases, other shard databases, other partition based databases, etc. can be utilized in the various embodiments. In some embodiments, while one storage node 103 executes code, the load (e.g., live data serving load) of the executing storage node 103 can be transferred to other replicate nodes. Under this circumstance, routing information can be changed based on the code execution status of the replicate storage nodes 103.

Figure 3:
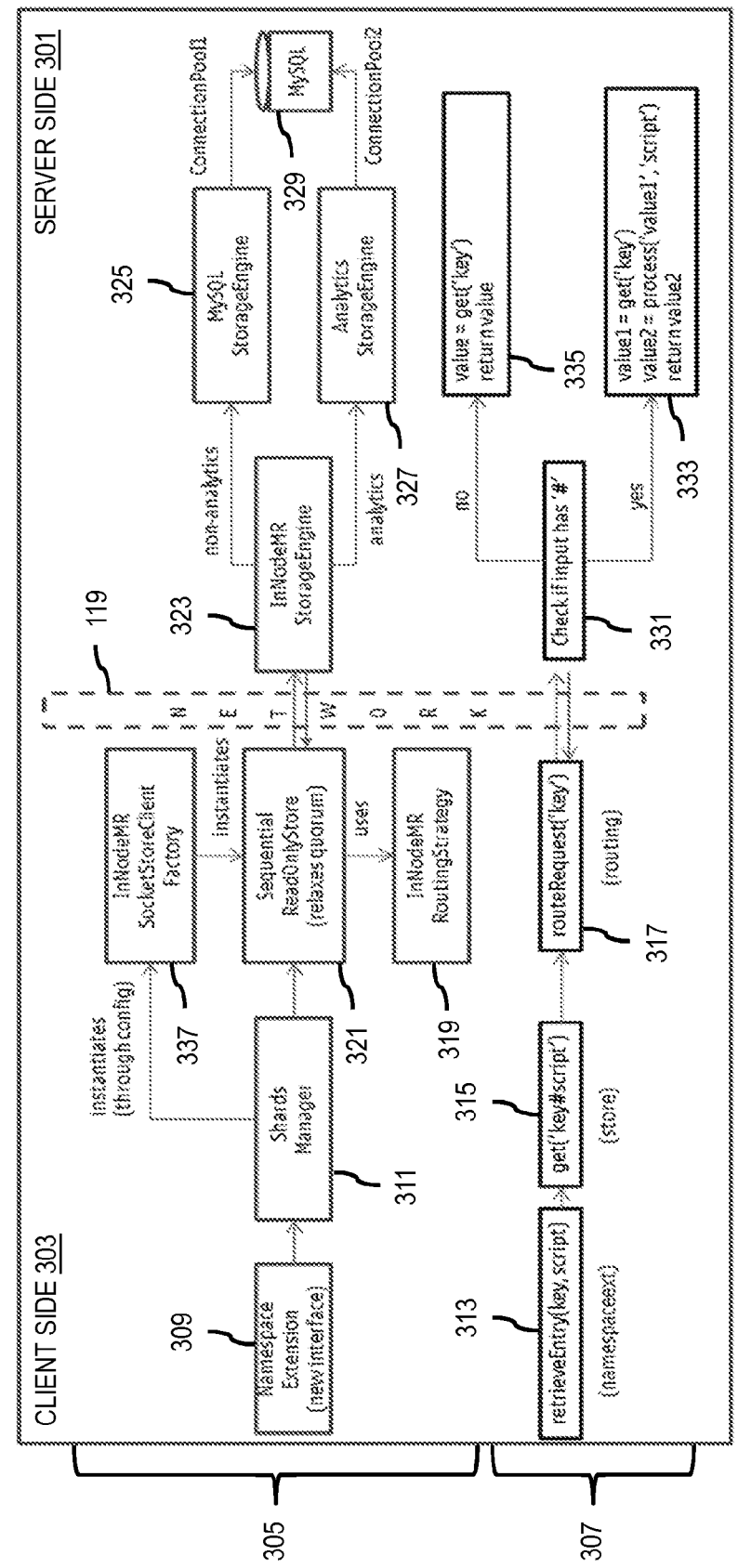
FIG. 3 is an example architecture for executing code in a distributed storage platform, according to one embodiment.

FIG. 3 is an example architecture for executing code in a distributed storage platform, according to one embodiment. The architecture 300 of FIG. 3 provides for an in-node code framework 113 implemented in within a distributed storage platform 101 implemented as a key-value store organized as one or more shards. In addition, the architecture 300 incorporates a distributed computing platform 105 that provides for processing of analytics based, at least in part, on the data maintained in the distributed storage platform 101. More specifically, the embodiment of the in-node code framework 113 of FIG. 3 provides In-Node Map Reduce (InNodeMR) functionality in the distributed storage platform 101 to provide for storage or server side 301 processing of data before returning the processed or reduced results to the analytics system (e.g., the distributed computing platform 105) that represents the client side 303. As noted above, in addition to the distributed computing platform 105, the client side 303 can represent any of the UE 109, the client application 111, the services platform 117, and/or any other component available over the communication network 119 that requests, processes, accesses, etc. data stored in the server side 301.

In one embodiment, the analytics system on the client side 303 can be used to, for instance, analyze data from different services like online stores or commerce, music services, social networking services, etc. that can produce interesting results that can be used to enhance the services. One goal of the architecture 300 is to provide a set of features (e.g., the in-node code framework 113) with which the server side 301 can integrate smoothly with the client side 303 by enabling the server side 301 (e.g., the distributed storage platform 101 and/or storage nodes 103) to themselves do at least a portion of the processing of data using, for instance, a map-reduce paradigm.

For example, the architecture 300 can be used process data to make recommendations, suggest store downloads based on user history or history of download by friends of the user, finding common friends among the services, and the like. In some of these use cases, data for performing the processing can be stored in the server side 301 and/or the client side 303. In either case, the architecture 300 enables the combination of data from both sides while also enabling the server side 301 to perform some of the processing itself so that only relevant data is returned or transmitted to the client side 303, thereby by saving network bandwidth. In some embodiments, the processing is performed in the storage nodes 103 using application specific logic or code. Therefore, the architecture 300 also enables execution of custom code (e.g., scripts and/or compiled code) in the storage nodes 103.

In other words, the various embodiments of the system 100 (including the architecture 300 described herein) enables the system 100 harness idle processing power available in the storage nodes 103 (e.g., servers) in the distributed storage platform 101. As noted previously, this enables the system 100 to minimize the network input/output traffic for data transfer by transferring only the processed or relevant portions of the data from the server side 301 to the client side 303. Therefore, the architecture 300 enable, for instance: (1) executing user defined code in the distributed storage platform 101 (e.g., a shards-based key-value store); (2) fetching key-value pairs through a parallel process (e.g., a map-reduce job such as a Hadoop job); (3) fetching values for keys processed by user defined code via the in-node code framework 113); (4) fetching complete namespace data through a map-reduce or Hadoop job; and the like. By way of example, a namespace refers to an application or container (e.g., a logical container) such that all keys, identifiers, etc. within the namespace are unique. In some embodiments, the namespace also provides for disambiguation of keys or identifiers that might have the same or similar names within different namespaces.

As shown, FIG. 3 depicts a component section 305 that describes a map reduce execution engine to implement at least some of the embodiments described herein, and a code or script description section 307 that illustrates the code or scripts processed by the map reduce execution engine. References to specific classes, APIs, scripts, and/or related information or objects are for illustration and are not intended to limit the various embodiments to such classes, scripts, APIs, etc. It is contemplated that one or more other equivalent classes, APIs, scripts, etc. can be used to perform one or more of the functions, roles, responsibilities, etc. discussed with respect to the various embodiments of the approach described herein. In one embodiment, the code or script that represents the processing logic to be executed via the in-node code framework 113 is written in JavaScript as a JavaScript Object Notation (JSON) text. Table 1 below provides an example of such a script. Table 1 is provided for illustration and is not intended to limit the format of the code used in the various embodiments. Accordingly, it is contemplated that the code can be represented in any other script and/or compiled format or language.

TABLE 1

```
{
    "id": "tokenize",
    "content":
        [{"map":
            "function map(key,value,context) {
                var parts = value.split(",");
                for (var i=0; i<parts.length; i++) {
                    context.collect(parts[i], "1");
                }
            }"
        }]
}
```

In one embodiment, the code is a script including a series of JavaScript functions which are executed one after another. As noted, the language of the script is JavaScript and the value stored in the distributed storage platform 101 or server side 301 is in JSON format. In one embodiment, the processing logic in the script is represented in the form of a series of map-reduce functions. The script code (e.g., the map-reduce functions) is executed in by the storage nodes 103 to return the results back to the client side 303.

By way of example, the storage nodes 103 may execute the scripts through one or more APIs that can take additional script parameters. In one embodiment, the script parameters can be tokenized. The server side 301 will then fetch the value of the key, process the value by the script, and return the result value back to the client side 303 as, for instance, an array of key-value pairs in JSON. An example of this process is provided in Table 2 below.

TABLE 2

| Method | Result |
| --- | --- |
| PUT "a" = "b, c" | Value of "a" = "b, c" is stored in Shards |
| GET "a" | Returns "b, c" |
| GET "a" [script = tokenize] | Returns [{"b":"1"}, {"c":"1"}] |

In one embodiment, the architecture 300 provides a set of connector classes for use by the client side 303 data job (e.g., a Hadoop job) to fetch data from the server side 301 (also referred to as Shards) more efficiently. Example use cases for the connector classes include fetching a value for a key, fetching all key-values of a namespace, etc. More specifically, in one embodiment, to fetch a value for a key in a Hadoop map, the mapper in the Hadoop job extends one or more abstract classes and implements its methods. For example, one class (e.g., a mapper class) can be used to optimize calls to the server side 301 by sending batch requests of jobs. In some embodiments the class or one or more other classes can be used relax the quorum requirement (e.g., reduce the requirement to receive responses from one than one replica or replicate node), thereby reducing the resource load on the system 100 by avoiding code execution at multiple replicas.

In another use case, the architecture 300 provides for fetching all-key values of a namespace. For example, a namespace within the server side 301 can have any number keys and fetching the entire namespace data from the server side 301 can be quite challenging because: (1) a namespace can have millions of keys with gigabytes or terabytes of data; (2) lack of available APIs for retrieving all key-values; (3) reading data through the traditional Shards layer can severely affect the performance of a storage cluster because of frequent garbage collection; and (4) high bandwidth usage for reading large amounts of data that can potentially increase latency. In some embodiments, to facilitate fetching data (e.g., key values), the architecture 300 provides one or more input format classes for data jobs (e.g., Hadoop jobs) which take care of reading data from the server side 301 and passes that to the data jobs on the client side 303.

In one embodiment, the architecture 300 provides for two possible ways to fetch data from the server side 301: (1) direct Java Database Connectivity (JDBC) connection to a database management system such as a MySQL database; and (2) reading data through a NamespaceExtension API 309 (as discussed in more detail below). For example, the direct connection approach has less impact on the server side 301 performance, but generally requires passing database credentials to the client side 303 and bypassing the storage abstraction layer of the server side 301.

In one embodiment, the architecture 300 integrates the server side 301 and the client side 303 via, for instance, the NamespaceExtension API 309 for allowing script execution and for efficient fetching of data from the server side 301 (e.g., Shards). In this example, the shards manager 311 facilitates access to the server side 301 via the NamespaceExtension API 309.

In one embodiment, as depicted in script description section 307, when processing a script at the client side 303, the script is appended to the original "key" along with the separator "#" in response the retrieveEntry(key, script) command 313. On receiving the get('key#script') command 315 and/or the routeRequest('key') command 317, the InNodeMRRoutingStrategy 319 uses the original "key" to determine the replicates storage nodes 103 on the server side 301 that contain the key. The SequentialReadOnlyStore 321 then contacts one of the replicate storage nodes 103 to fetch the value of the key. In case of failures, the SequentialReadOnlyStore 321 can contact one or more of the other replicate nodes 103.

In one embodiment, the storage nodes 103 are of the type InNodeMRStorageEngine 323 which internally has, for instance, two storage engines: a MySQLStorageEngine 325 for handling non-analytics storage and an AnalyticsStorageEngine 327 for handling analytics storage. By way of example, both of the internal storage engines are instances of MySQL storage 329 except that the AnalyticsStorageEngine 327 has a different connection pool that the MySQLStorageEngine 325. The connection pools for each respective engine can have different numbers of threads.

At process 331, the InNodeMRStorageEngine 323 receives the get command 315 and checks if the job or request is for analytics or not (e.g., by checking for the presence of the "#" separator) and delegates the request to the appropriate inner storage engine. If a script is provided with the get command 315, then the value of the requested key is also processed through the script or code and the output is sent back to the client side 303 as shown in process 333. By way of example, when processing a script, a new namespace (e.g., shards_script) is created to store the script content with, for instance, the key as "scripted.UUID". In one embodiment, if the script is stored in Shards by the Hadoop Mapper init( ) method and can be deleted in the close( ) method. The calls to the Shards will then contain only the unique reference of the script. In this case, the storage node 103 executing the script can: (1) check if the script is present or not and fetch the script contents if not present; (2) compile the script and store the reference in a local cache; and/or (3) process the value of a key using the compiled JavaScript. If no script is provided, the value of the requested key is retrieved and returned without processing as shown in process 335.

In one embodiment, the architecture 300 can provide for control of the resource usage at the server side 301 (e.g., at the storage nodes 103). For example, such control resource control measures include, for instance, quorum relaxation, throttling, and the like. More specifically, with respect to quorum relaxation, in one embodiment, the default socket client factory uses required reads as defined in the store definition of the namespace (e.g., how may replicate storage nodes 103 to read from). Any requirement to read from multiple nodes 103 (e.g., a quorum requirement) can be relaxed or overridden with InNodeMRSocketStoreClientFactory 337 which will fetch the value of a key from only one of the available replicate storage nodes 103 to, for instance, reduce requirements associated with reading from multiple nodes 103.

With respect to throttling, the server side 301 can control the resource burden on the storage nodes 103 for executing code or scripts by serving such requests (e.g., analytics requests with accompanying scripts) through HTTPService. More specifically, to prevent frontend traffic from facing a sudden burst in socket connections from requests using the in-node code framework 113, the HTTPService can be enabled and all requests for analytics can use the HTTPService only. In this way, the server side 301 can limit the resource impacts of the scripts by limiting the number of connections or threads. In addition or alternatively, the server side 301 an limit the network bandwidth allocated for serving analytics requests. In another embodiment, the server side 301 can separate the connection pool used for analytics requests to limit the impact on MySQL 329.

Figure 4:
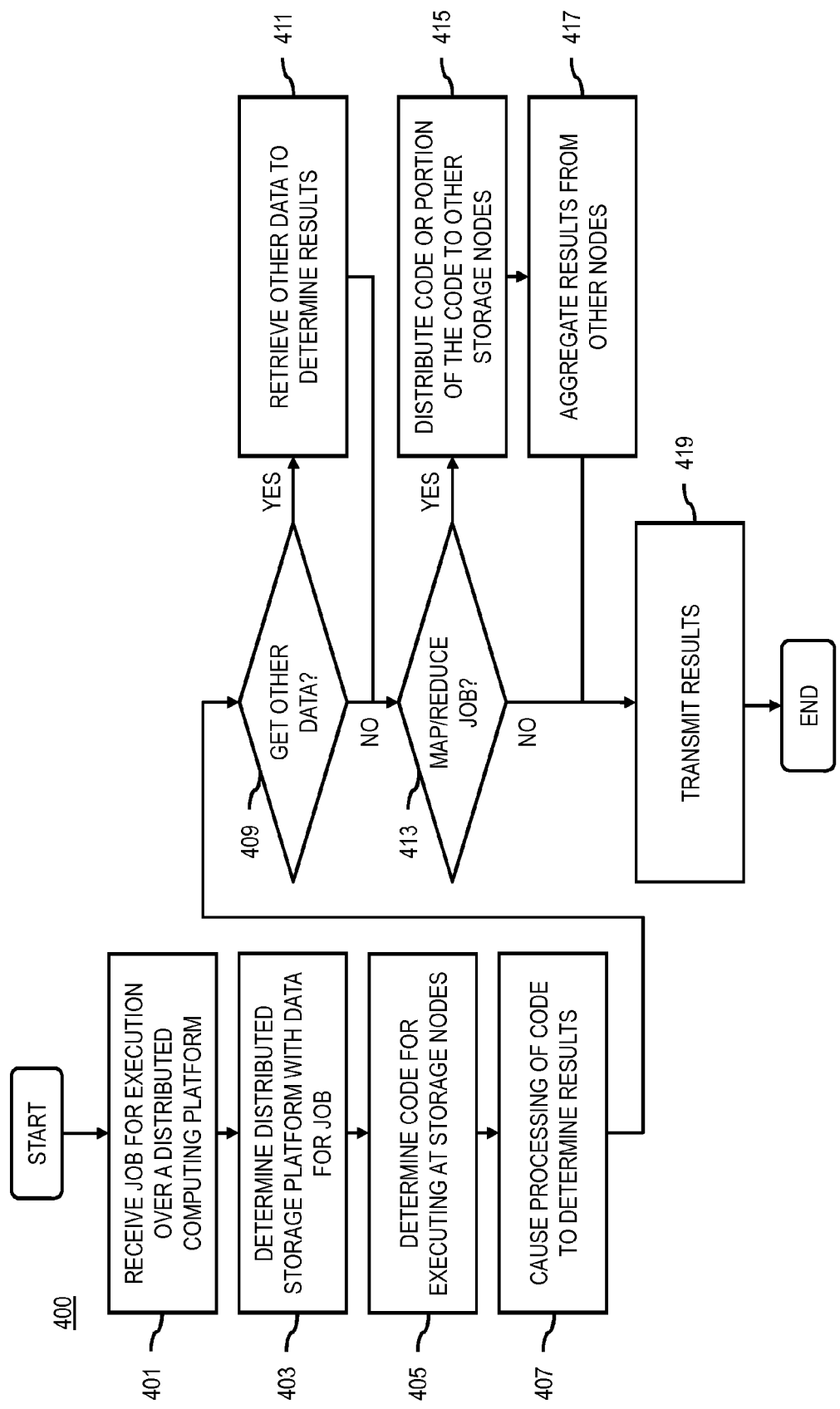
FIG. 4 is a flowchart of a process for executing code in a distributed storage platform, according to one embodiment.
Figure 7:
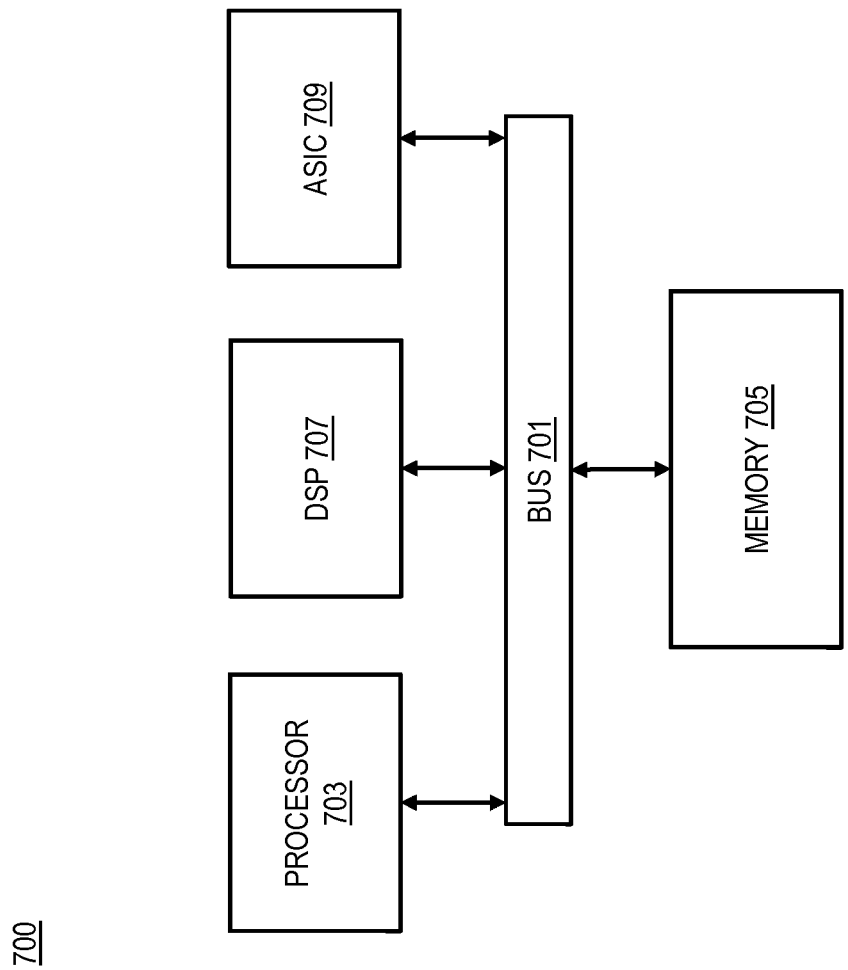
FIG. 7 is a diagram of a chip set that can be used to implement an embodiment of the invention.

FIG. 4 is a flowchart of a process for executing code in a distributed storage platform, according to one embodiment. In one embodiment, the in-node code framework 113 of a distribute storage platform 101 performs the process 400 and is implemented in, for instance, a chip set including a processor and a memory as shown in FIG. 7. In step 401, the in-node code framework 113 receives at least one job for execution over a distributed computing platform. The framework 113 then determines at least one distributed storage platform containing at least a portion of the data for executing the at least one job (step 403).

Next, the framework 113 processes and/or facilitates a processing of the at least one job to determine code for executing at one or more storage nodes of the at least one distributed storage platform, wherein the code supports the at least one job (step 405). In one embodiment, the code is encoded in the at least one job, at least one request to initiate the at least one job, or a combination thereof. For example, the code (e.g., a script) can be specified in its entirety as a parameter included as part of the job request. In addition or alternatively, the code can include, at least in part, one or more pointers to one or more scripts preconfigured at the at least one distributed storage platform 101, the one or more storage nodes 103, or a combination thereof. In one embodiment, the one or more pointers represent one or more keys stored in the at least one distributed storage platform 101, the one or more storage nodes 103, or a combination thereof. In this way, the code need only specify an identifier that the storage nodes 103 can use to retrieve the code from a storage or cache.

In step 407, the framework 113 process and/or facilitate a processing of the code at the one or more storage nodes to determine one or more results of the at least one job. In step 409, the framework 113 can optionally process and/or facilitate a processing of the code at the one or more storage nodes 103 to determine other data that might be needed for executing the code. If other data is needed, the framework 113 causes, at least in part, retrieving of the other data, wherein the one or more results are further based, at least in part, on the other data (step 411). In other words, a job might cause that the storage node 103 to execute code that processes data that is stored in the distributed storage platform 101 in addition to data store in another component of the network 119 (e.g., the UE 109). For example, to execute an recommendation job, the job or code might specify processing both a user profile stored in the distributed storage platform 101 (e.g., as backend data) as well as user activity logs stored at the UE 109. Accordingly, the in-node code framework 113, one or more corresponding storage nodes 103, the distributed storage platform 101, or a combination thereof include means for retrieving the other data.

If the at least one job uses parallel computation processes such as a map-reduce paradigm, the framework 113 determines that the at least one job is a map-reduce job (step 413). In this case, the code can be for causing, at least in part, a performing of at least a map phase of the map/reduce job. Accordingly, the in-node code framework 113 can partition and/or distribute the code to one or more other storage nodes 103 for processing (step 415). By way of example, the distribution can be based, at least in part, on whether the other nodes 103 contain keys or other data specified in the code, the at least one job, or a combination thereof. The in-node code framework 113 then aggregates the results from the various storage nodes 103 and applies, for instance, a reduce function to generate a combined result (step 417).

After generating the results, the framework 113 cause, at least in part, a transmission of the one or more results to the distributed computing platform 105, one or more computing nodes 107 of the distributed computing platform 105, at least one client (e.g., client application 111) requesting the at least one job, or a combination thereof (step 419). As discussed above, by transmitting only processed and/or relevant data, the framework 113 enables the system 100 to reduce network bandwidth usage, as well as leverage the use of potentially idle processing capabilities available at the storage nodes 103.

Figure 5:
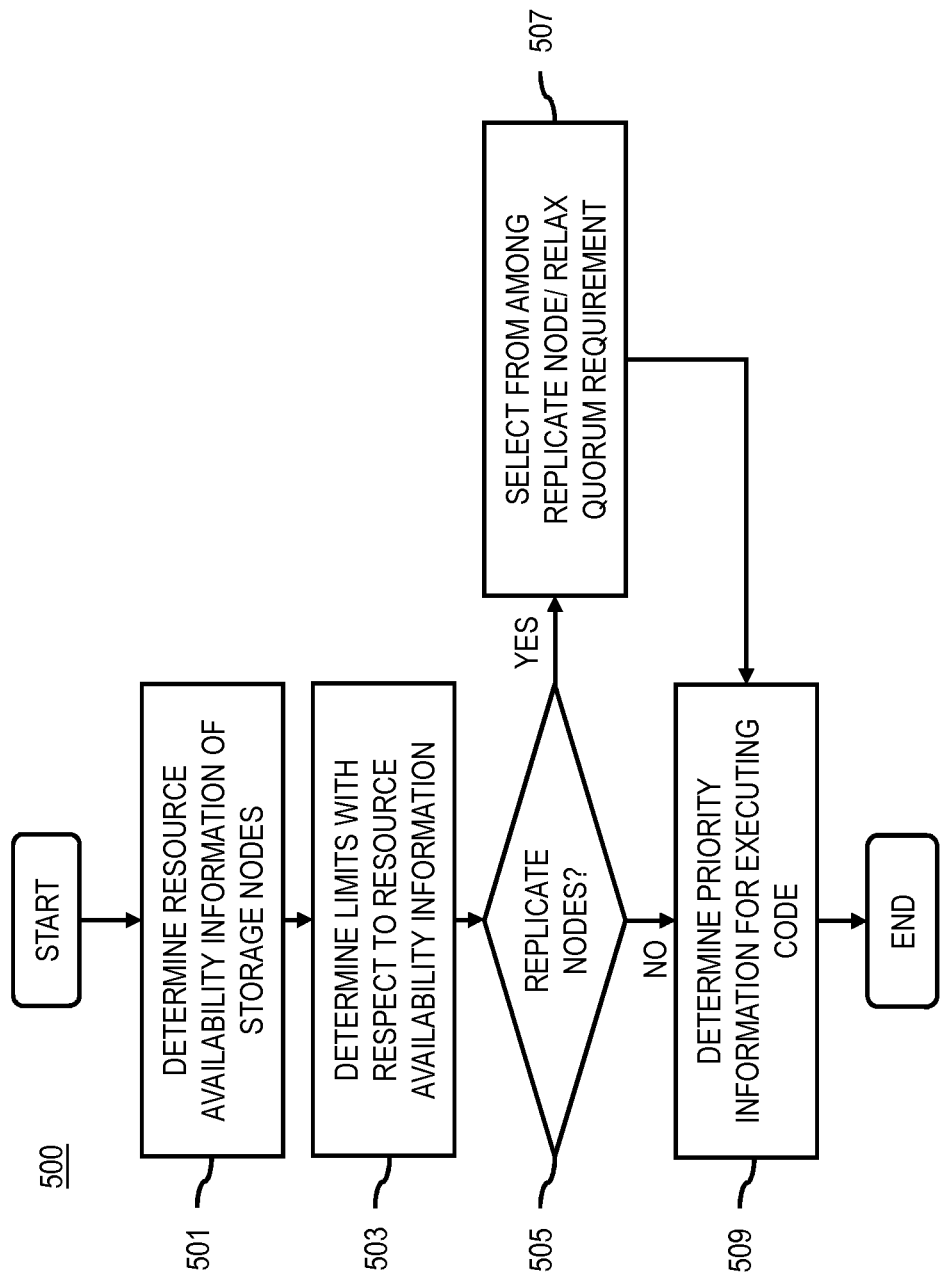
FIG. 5 is a flowchart of a process for distributing code among storage nodes of a distributed storage platform, according to one embodiment.

FIG. 5 is a flowchart of a process for distributing code among storage nodes of a distributed storage platform, according to one embodiment. FIG. 4 is a flowchart of a process for executing code in a distributed storage platform, according to one embodiment. In one embodiment, the in-node code framework 113 of a distribute storage platform 101 performs the process 500 and is implemented in, for instance, a chip set including a processor and a memory as shown in FIG. 7. The process 500 assumes that the in-node code framework 113 has determined to distribute and/or execute code at one or more storage nodes 103 as described with respect to the process 400 of FIG. 4.

In step 501, the in-node code framework 113 processes and/or facilitates a processing of resource availability information associated with the one or more storage nodes 103 to determine priority information for executing the code. In one embodiment, the resource availability information includes, at least in part, processor availability information, bandwidth availability information, information on one or more other jobs executing at the one or more storage nodes 103, or a combination thereof. For example, in one embodiment, the execution of arbitrary code at the storage node 103 is considered to be an ancillary process that is subordinate to the main purpose of the storage nodes 103 (e.g., live serving of data to clients).

Accordingly, the framework 113 can determine and/or set one or more limits with respect to the resource availability information, wherein the priority information, the executing of the code, or a combination thereof is based, at least in part, on the one or more limits (step 503). For example, if executing a the code or script will tax the available resources of the storage node 103, the framework 113 can throttle or reduce the resources devoted to executing such code. This throttling can be, for instance, based on the priority information (e.g., what priority the code is assigned relative to other tasks executing at the storage node 103).

Another factor that can affect the distribution of the code among storage nodes 103 is the whether the distributed storage platform 101 employs replicas (e.g., replicate storage nodes 103, shards, databases, etc.). In this case, the in-node code framework 113 may reduce resource requirements further by, for instance, determining that the one or more storage nodes 103 include at least one or more replicate nodes (step 505). If there are available replicas, the framework 113 can relax the quorum requirement among the replicas and select just one of the replicas for executing the code (step 507). In this way, the framework 113 can reduce the burden associated with executing the code and reconciling the corresponding results among multiple nodes 103.

Based, at least in part, on the determined resource availability information and/or the replica selection, the framework 113 can determine the priority information associated with executing the code at the respective storage nodes 103 (step 509). In one embodiment, the priority information is determined on a node by node basis so that the priority, throttling, etc. of the execution of the code can be tailored for individual nodes 103. In addition or alternatively, the priority information can be determined collectively for the distributed storage platform 101 as a whole, for clusters of nodes 103 with the platform 101, or other defined groups of the storage nodes 103.

The processes described herein for providing a framework for executing code in a distributed storage platform may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
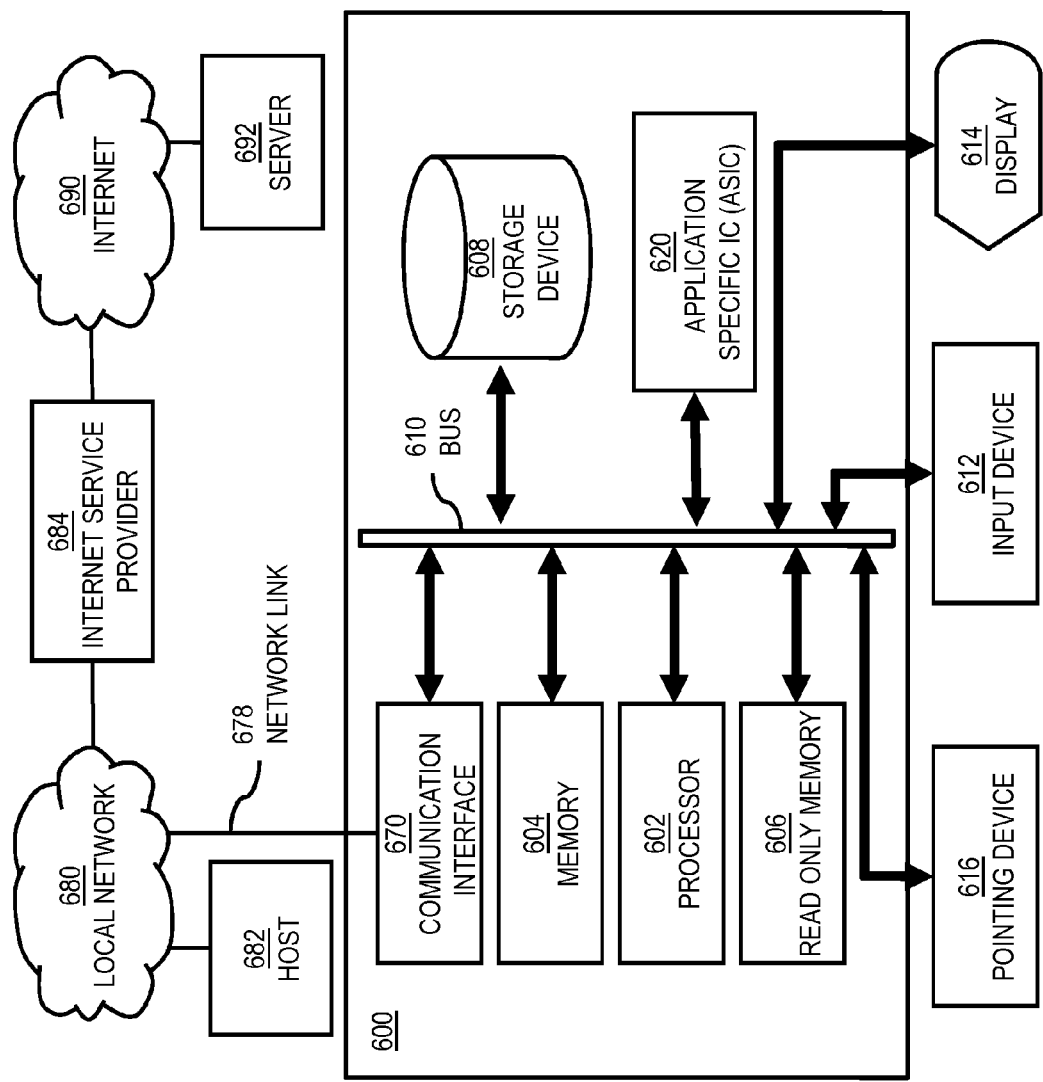
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide a framework for executing code in a distributed storage platform as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of providing a framework for executing code in a distributed storage platform.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to providing a framework for executing code in a distributed storage platform. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for providing a framework for executing code in a distributed storage platform. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing a framework for executing code in a distributed storage platform, is provided to the bus 610 for use by the processor from an external input device 612, such as a keyboard containing alphanumeric keys operated by a human user, a microphone, an Infrared (IR) remote control, a joystick, a game pad, a stylus pen, a tough screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 119 for providing a framework for executing code in a distributed storage platform.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to provide a framework for executing code in a distributed storage platform as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of providing a framework for executing code in a distributed storage platform.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide a framework for executing code in a distributed storage platform. The memory 705 also stores the data associated with or generated by the execution of the inventive steps.

Figure 8:
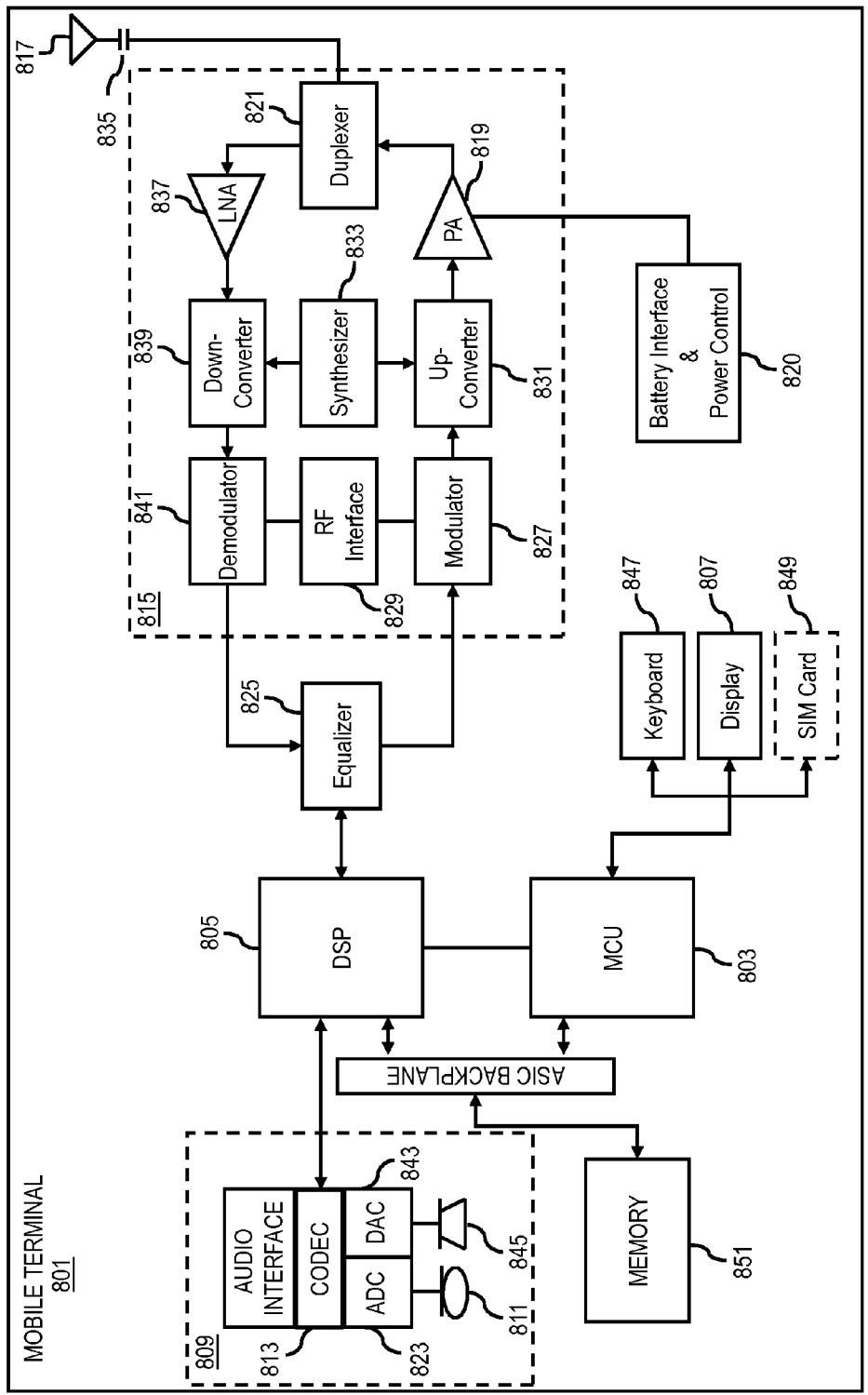
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of providing a framework for executing code in a distributed storage platform. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory (ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of providing a framework for executing code in a distributed storage platform. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to provide a framework for executing code in a distributed storage platform. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    at least one job for execution over a distributed computing platform;
    at least one distributed storage platform containing one or more storage nodes stored with data required for executing the at least one job and containing one or more replicate nodes of the one or more storage nodes, wherein the data is partitioned into portions that are stored in one or more of the replicate nodes based on a predetermined scheme;
    a transmission of the portions from the one or more storage nodes and from the one or more replicate nodes, based on a calculation requirement, to the distributed computing platform, one or more computing nodes of the distributed computing platform, at least one client requesting the at least one job, or a combination thereof, wherein the calculation requirement specifies a predetermined number of the portions replicated in the replicate nodes to be calculated independently and in parallel with identical processing; and
    a determination that results of the identical processing are inconsistent to trigger a work load adjustment of one or more of the storage nodes, the replicate nodes, or a combination thereof.

2. A method of claim 1, wherein the (1) data and/or (2) information and/or (3) at least one signal are further based, at least in part, on the following:
    a processing of the at least one job to independently determine at the one or more storage nodes code for transforming the portions of the data to a reduced form at the one or more storage nodes, wherein the code supports the at least one job;
    a processing of at least a part of the code at the one or more storage nodes to determine one or more results of the at least one job;
    a processing of the one or more results to independently determine at the one or more storage nodes another code for transforming the at least one portion of the one or more results to a reduced form at the one or more storage nodes;
    an aggregation of one or more transformed results via a reduce function into a combined result; and a transmission of the one or more transformed results including the at least one portion in the reduced form, the combined result, or a combination thereof, to the distributed computing platform, one or more computing nodes of the distributed computing platform, at least one client requesting the at least one job, or a combination thereof.

3. A method of claim 2, wherein the (1) data and/or (2) information and/or (3) at least one signal are further based, at least in part, on the following:
a processing of the code at the one or more storage nodes to determine other data,
wherein the one or more transformed results are further based, at least in part, on the other data.

4. A method of claim 2, wherein the (1) data and/or (2) information and/or (3) at least one signal are further based, at least in part, on the following:
at least one determination that the at least one job is a map/reduce job,
wherein the code is for causing, at least in part, a performing of at least a map phase of the map/reduce job.

5. A method of claim 4, wherein the (1) data and/or (2) information and/or (3) at least one signal are further based, at least in part, on the following:
a processing of resource availability
information associated with the one or more storage nodes to determine priority information for executing the code.

6. A method of claim 5, wherein the (1) data and/or (2) information and/or (3) at least one signal are further based, at least in part, on the following:
one or more limits with respect to the resource availability information,
wherein the priority information, the executing of the code, or a combination thereof is based, at least in part, on the one or more limits.

7. A method of claim 5, wherein the resource availability information includes, at least in part, processor availability information, bandwidth availability information, information on one or more other jobs executing at the one or more storage nodes, or a combination thereof.

8. A method of claim 2, wherein the (1) data and/or (2) information and/or (3) at least one signal are further based, at least in part, on the following:
a selection of at least one of the one or more replicate nodes to execute the code in place of at least one of the one or more of the storage nodes requiring the work load adjustment.

9. A method of claim 2, wherein the distributed storage platform is a distributed key-value storage system, and
the code includes one or more pointers to one or more scripts preconfigured at the at least one distributed storage platform, the one or more storage nodes, or a combination thereof.

10. A method of claim 9, wherein
the one or more pointers represent one or more keys that are hashed to a primary storage location and one or more replicate storage locations in the storage nodes that store the at least one portion of the data, and
the one or more keys are stored in the at least one distributed storage platform, the one or more storage nodes, or a combination thereof.

11. A method of claim 1, wherein the (1) data and/or (2) information and/or (3) at least one signal are further based, at least in part, on the following:
a relaxation of the calculation requirement of the distributed storage platform by executing the identical processing on the portions from the storage nodes and on the portions from only one of the replicate nodes.

12. An apparatus comprising:
at least one processor; and
at least one memory including computer program code for one or more programs,
the at least one memory and the computer program code configured to, with the at least one processor, cause the apparatus to perform at least the following,
receive at least one job for execution over a distributed computing platform;
determine at least one distributed storage platform containing one or more storage nodes stored with data required for executing the at least one job and containing one or more replicate nodes of the one or more storage nodes, wherein the data is partitioned into portions that are stored in one or more of the replicate nodes based on a predetermined scheme;
transmit the portions from the one or more storage nodes and from the one or more replicate nodes, based on a calculation requirement, to the distributed computing platform, one or more computing nodes of the distributed computing platform, at least one client requesting the at least one job, or a combination thereof, wherein the calculation requirement specifies a predetermined number of the portions replicated in the replicate nodes to be calculated independently and in parallel with identical processing;
determine that results of the identical processing are inconsistent to trigger a work load adjustment of one or more of the storage nodes, the replicate nodes, or a combination thereof.

13. An apparatus of claim 12, wherein the apparatus is further caused to:
process and/or facilitate a processing of the at least one job to independently determine at one or more storage nodes of the at least one distributed storage platform code for transforming the at least a portion of the data to a reduced form at the one or more storage nodes, wherein the code supports the at least one job;
process and/or facilitate a processing of at least a part of the code at the one or more storage nodes to determine one or more results of the at least one job;
process and/or facilitate a processing of the one or more results to independently determine at the one or more storage nodes another code for transforming the at least one portion of the one or more of the results to a reduced form at the one or more storage nodes; and
cause, at least in part, a transmission of the one or more results including the at least one portion in the reduced form, the combined result, or a combination thereof, to the distributed computing platform, one or more computing nodes of the distributed computing platform, at least one client requesting the at least one job, or a combination thereof.

14. An apparatus of claim 13, wherein the apparatus is further caused to:
process and/or facilitate a processing of the code at the one or more storage nodes to determine other data,
wherein the one or more results are further based, at least in part, on the other data.

15. An apparatus of claim 13, wherein the apparatus is further caused to:
determine that the at least one job is a map/reduce job,
wherein the code is for causing, at least in part, a performing of at least a map phase of the map/reduce job.

16. An apparatus of claim 15, wherein the apparatus is further caused to:

process and/or facilitate a processing of resource availability information associated with the one or more storage nodes to determine priority information for executing the code.

17. An apparatus of claim 16, wherein the apparatus is further caused to:
determine one or more limits with respect to the resource availability information,
wherein the priority information, the executing of the code, or a combination thereof is based, at least in part, on the one or more limits.

18. An apparatus of claim 16, wherein the resource availability information includes, at least in part, processor availability information, bandwidth availability information, information on one or more other jobs executing at the one or more storage nodes, or a combination thereof.

19. An apparatus of claim 13, wherein the apparatus is further caused to:
determine that the one or more storage nodes include one or more replicate nodes of one of the one or more storage nodes; and
cause, at least in part, a selection of at least one of the one or more replicate nodes to execute the code.

20. An apparatus of claim 13, wherein the code includes one or more pointers to one or more scripts preconfigured at the at least one distributed storage platform, the one or more storage nodes, or a combination thereof.

* * * * *